Patented Apr. 28, 1936

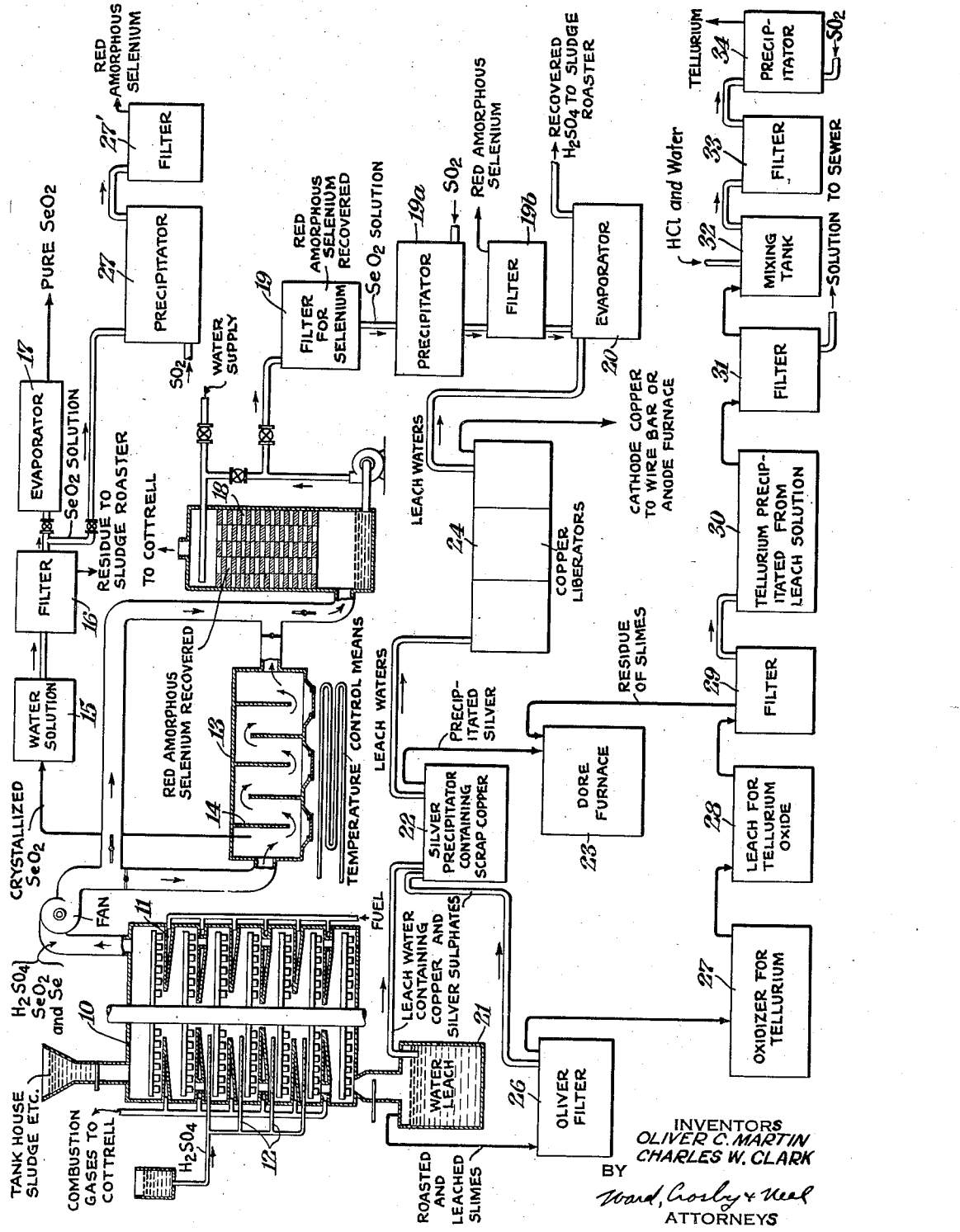

2,039,256

UNITED STATES PATENT OFFICE 2,039,256

PROCESS OF TREATING REFINERY SLUDGES OR SLIMES CONTAINING SELENIUM AND TELLURIUM

Oliver C. Martin, Westfield, N. J., and Charles W. Clark, Montreal West, Quebec, Canada Application February 17, 1934, Serial No. 711,622

25 Claims. (Cl. 75—99)

This invention relates to the treatment of copper refinery sludges, as for example so-called "tank-house" sludges or "anode slimes", and particularly those containing precious metals such as gold and silver, with substantial amounts of selenium and tellurium combined as selenides and tellurides of the metals contained. The conventional method of removal of such selenium constitutes a costly and troublesome operation, yet in so far as the recovery of the gold and silver is concerned these selenides and tellurides are undesirable contaminations, the elimination of which is an important problem.

As an example of such conventional or standard practice, reference is now made briefly to a method of treatment according to which raw slimes of the general character first mentioned above are subjected to an oxidizing roast intended to facilitate subsequent removal of copper from the slimes by leaching the latter with sulphuric acid.

During the roasting process some of the selenide content is oxidized to selenium dioxide ($SeO_2$), a portion of which is carried into the flue system, and this portion is in a state of an admixture with substantial quantities of precious metals, and must be treated further for the removal of selenium and tellurium and recovery of values.

During the subsequent leaching process with sulphuric acid, a further portion of the selenium is dissolved from the roasted slimes, and the removal of selenium from these leach liquors is usually accomplished by passing the solutions over scrap copper, where the selenium is precipitated as copper selenide ($Cu_2Se$). This copper selenide sludge contains copper values which, to be recovered, must be put back through the copper refining process, thus involving recycling and a progressive building up of the selenium content, in process. The tellurium content involves similar difficulties.

The bulk of the selenium which is unoxidized in the roasting operation remains in the slimes and must be removed before the gold and silver can be extracted as doré metal. The standard practice is to flap soda and nitre in large quantities into the molten bath of silver selenides and gold until all the selenium is separated as sodium selenite. This material is removed from the bath by skimming, and is known as a soda selenium slag, and as this slag contains considerable quantities of precious metals, it is necessary to leach such slag with water and filter off the residue which contains the precious metals. This residue must be returned to the process for additional treatment, and it is customary in some refineries to produce selenium from these soda leach liquors by neutralizing and acidifying with hydrochloric acid and precipitating the selenium therefrom with sulphur dioxide gas.

In contradistinction to the above described conventional method, which is inefficient, expensive and unduly involved, the present invention provides for the treatment of the tank-house sludges and "slimes" by a novel process which effects the elimination or substantial elimination of the selenium, and the separation of the same from the tellurium, at the start of the operations of refining the slimes, and reduces the undesirable effects of the selenium, also largely eliminating the trouble and expense of retreatments later in the process. Also the selenium is eliminated in such a form that its subsequent recovery and production in various allotropic forms, is practical and cheap, so that the selenium and selenium products may be sold at commercially satisfactory prices in response to the widening demands therefor in various fields.

Also, according to this invention, the tellurium may be readily separated out and economically recovered in purified form for commercial uses.

Further and more specific objects, features and advantages will more clearly appear from the detailed description given below taken in connection with the accompanying drawing which discloses by way of example certain embodiments of apparatus which may be used in practicing the invention.

The invention consists in such novel combinations of apparatus, methods, processes and process steps as may be shown and described in connection with the apparatus arrangements herein disclosed by way of example only and as illustrative of preferred embodiments.

According to our new process, the raw sludges or slimes are first treated, as by filtering, to remove excess electrolyte and are then roasted, for example at 650° to 700° F., with additions of sulphuric acid. This step may be accomplished satisfactorily by continuously feeding the material substantially with the exclusion of air, through a multiple hearth furnace, as indicated at 10 in the drawing, provided with heating means 11, of a muffle type, the sulphuric acid being sprayed onto the roasting material by means of automatic sprays 12. Multiple hearth furnaces provided with rotary central shafts and rabble arms of the Herreshoff type, and having muffle type heating means, are particularly adaptable for this purpose. The furnace may be operated at the customary rate of speed for such furnaces.

This sulphatizing roasting of the material in a muffle furnace converts the copper, silver and other selenides to the corresponding sulphates, the selenium being then liberated from the selenides and volatilized as selenium and selenium dioxide, which is passed out, together with some of the sulphuric acid, through the furnace flue.

The furnace is preferably operated under very slight draft derived wholly or substantially wholly from the gases and vapor formed in the furnace as withdrawn by the fan indicated, so that substantially no flue dust is lost as in the oxidizing roast of the prior practice. The amount of acid used in the sulphatizing roasting operation will depend upon the character of the slimes and other factors, but an ample amount, readily determined by trial, is added to insure elimination of most of the selenium (in excess of 95%) during the roasting.

The gases may be passed through a condenser 13 supplied with baffles 14 and then to a scrubber 18 or, alternatively, directly from the furnace to the scrubber, or, alternatively, to the Cottrell.

In the first case, the condenser temperature is controlled and kept above the condensation point of sulphuric acid and below the temperature at which selenium dioxide crystals form. The crystallized selenium dioxide may be cleaned from the condenser periodically, taken into water solution, as indicated at 15, or into another suitable solvent, and may be then filtered, at 16, and evaporated down at 17, to produce substantially pure selenium dioxide which is in the form of discrete particles adapted for the production of selenium or selenium products.

The crystallized selenium dioxide may also be purified by revolatilization and sublimation in lieu of the above described process of purifying the same.

From the selenium dioxide thus obtained, it is possible to produce selenium in the various known ways, in any of its allotropic forms. The vitreous type may be produced by heating the selenium dioxide with suitable reducing reagents, as for example carbon. The gray metallic form may be produced in the same manner by controlling the rate of cooling of the liquid selenium. The red, or amorphous, type may be produced by reducing the selenium dioxide solutions with sulphur dioxide gas in a precipitator, as indicated at 27 in the drawing, the selenium then being filtered out as indicated at 27'.

In the second case, the gases evolved from the roast may be led directly to the water scrubbing tower 18, which removes the entrained selenium and selenium dioxide from the gas. The selenium deposits out in the scrubber in a red amorphous form and the selenium oxide will go into solution in the water. Periodically the scrubber water is filtered as at 19, to remove selenium. The elemental selenium from the filter 19, if desired, may be returned to the furnace 10 for oxidation. This will enable recovery of any entrained values therefrom. Also from the resulting oxidized form, selenium may be recovered in a pure state. The selenium of the selenium dioxide contained in the solution from the scrubber may then be removed, for example by an SO$_2$ precipitator 19a and filter 19b; then the water may also be evaporated down, as indicated at 20, to recover sulphuric acid which is used to supplement the sludge acid requirements of the roasting operation.

The roasted slimes from the muffle furnace may be subjected to a water leach at 21 which removes practically all the copper as copper sulphate and some silver as silver sulphate from the slimes. It is unnecessary to add acid in this leaching process. The leach waters are practically free from selenium but, since they contain silver due to the soluble silver sulphate from the roasted slimes, it is desirable to precipitate this silver from the liquors preferably by means of scrap copper, as indicated at 22. The precipitated silver may be charged directly into the doré furnace 23 for further refining. The leach liquors, after the silver is precipitated from them, may be sent to liberators 24 (for example, electrolytic cells), where cathode copper suitable for charging directly to the "wire bar" and/or "anode" furnaces is deposited out. Due to the elimination of selenium at the start of the process, we are not troubled with the liberator muds of copper selenide at this point.

With the above described process the iron cementation tanks used at present to recover copper values in the liquors from the liberator tanks are eliminated.

The leach waters, after removal of copper, may be sent to the evaporator, indicated at 20, for the production of raw sulphuric acid to be used again in the sulphatizing muffle roaster. When such recovered acid becomes foul, it may be replaced or supplemented by fresh quantities of concentrated sulphuric acid.

After the roasted slimes are water-leached, they may be filtered at 26, for example in an Oliver type filter. The tellurium remains in the roasted slimes after leaching out the copper and filtering. Any remaining tellurides in this residue are oxidized at 27 by means of some suitable oxidizing agent such as nitric acid or nitre. The tellurium oxide is then extracted by leaching at 28, with either an acid such as sulphuric or hydrochloric, or with an alkali such as sodium hydroxide or sodium carbonate. The leach solution is filtered at 29, and the tellurium then precipitated from these solutions at 30, by sulphur dioxide gas, by electrolysis, or some other known means. After the leach solution is filtered at 29, if for example a caustic solvent has been used in the leaching, the solution is mixed in the precipitator tank 30 with sulphuric acid for neutralizing the leach with consequent precipitation of the tellurium. To secure purified tellurium, the mixture from the precipitator 30 may then be conveyed to a filter 31 and the filter cake containing the tellurium may thereafter be conveyed to a tank 32 and mixed with hydrochloric acid and water, whereby the tellurium goes into solution. This solution may again be filtered as at 33 and the resulting solution containing the tellurium may then be treated with SO$_2$ in a precipitator 34 for the precipitation of the elemental tellurium. With this process the tellurium may be recovered with a high degree of purity.

The residue of slimes from the filter 29 may be conducted to the doré furnace 23 for further refining. After the elimination of tellurium, the doré practice in the new process may be the same as at present with the exception that considerably less chemicals are necessary and less time will be required to produce doré metal. It is also possible to use much smaller furnaces for a given quantity of doré metal produced. This is brought about by the elimination of selenium at the start of the refining process.

Certain improvements and modifications in the above described process are described and claimed in our copending application Ser. No. 67,998, filed March 10, 1936.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Process of recovering tellurium from slimes containing the same, which comprises subjecting the slimes to a sulphatizing roast, subsequently oxidizing the tellurium content of the roasted slimes, leaching the resulting oxidized tellurium content with a reagent, and then treating the leach solution with a neutralizing reagent whereby the tellurium is precipitated.

2. A process of treating materials of the nature of refinery "tank-house" sludges or "anode slimes" containing copper selenides and/or silver selenides in substantial quantities, said process comprising the roasting of the raw slimes with additions of sulphuric acid, thus converting the selenides to the corresponding sulphates and selenium being thereby liberated from the selenides as volatilized selenium dioxide, collecting and crystallizing said selenium dioxide out of the presence of the roasted slimes, dissolving the crystals in a suitable solvent such as water, and filtering and evaporating the solution to yield pure selenium dioxide in the form of particles adapted for use in the formation of selenium or selenium products.

3. A process of treating materials of the nature of refinery "tank-house" sludges or "anode slimes" containing copper selenides and/or silver selenides in substantial quantities, said process comprising the roasting of the raw slimes at 650°–700° F., with addition of sulphuric acid, to form volatilized selenium and/or selenium dioxide, then crystallizing said selenium dioxide in a condenser, removing the crystalline selenium dioxide from said condenser, dissolving the selenium dioxide crystals in a suitable solvent such as water, and filtering and evaporating the same to yield pure selenium dioxide in the form of particles adapted for use in the formation of selenium or selenium products.

4. A process of treating materials of the nature of copper refinery "tank-house" sludges or "anode slimes" containing precious metals, with copper and/or silver selenides in substantial quantities, said process comprising the roasting of the raw slimes in a multiple hearth muffle type furnace at 650° to 700° F., with additions of sulphuric acid sprayed onto the materials, thus converting the copper and/or silver selenides to the corresponding sulphates and the selenium being thereby liberated from the selenides as volatilized selenium and/or selenium dioxide.

5. A process of treating materials of the nature of copper refinery "tank-house sludges" or "anode slimes" containing precious metal, with copper and/or silver selenides in substantial quantities, said process comprising subjecting the raw slimes to a sulphatizing roast while rabbling the same through a plurality of zones in a furnace, thus converting the copper and/or silver selenides to the corresponding sulphates and the selenium being thereby liberated from the selenides as volatilized selenium and/or selenium dioxide, conducting the gases and vapors evolved by the sulphatizing roast including the selenium and/or selenium dioxide as formed out of the presence of the roasted slimes, whereby the objectionable proportions of the selenium are eliminated from said materials, subsequently refining the remaining materials and recovering the precious metals, subjecting said gases and vapors to water-scrubbing, thereby recovering entrained selenium from the gases, and depositing said recovered selenium in red amorphous form in the scrubber.

6. A process of treating materials of the nature of copper refinery "tank-house sludges" or "anode slimes" containing precious metal, with copper and/or silver selenides in substantial quantities, said process comprising subjecting the raw slimes to a sulphatizing roast while rabbling the same through a plurality of zones in a furnace, thus converting the copper and/or silver selenides to the corresponding sulphates and the selenium being thereby liberated from the selenides as volatilized selenium and/or selenium dioxide, conducting such selenium and/or selenium dioxide as formed out of the presence of the roasted slimes, whereby the objectionable proportions of the selenium are eliminated from said materials, water-leaching the roasted slimes to remove therefrom substantially all the copper sulphate and at least some silver in the form of silver sulphate, and precipitating the silver from said leach waters by the use of copper.

7. A process of treating materials of the nature of copper refinery "tank-house sludges" or "anode slimes" containing precious metal, with copper and/or silver selenides in substantial quantities, said process comprising subjecting the raw slimes to a sulphatizing roast while rabbling the same through a plurality of zones in a furnace, thus converting the copper and/or silver selenides to the corresponding sulphates and the selenium being thereby liberated from the selenides as volatilized selenium and/or selenium dioxide, conducting such selenium and/or selenium dioxide as formed out of the presence of the roasted slimes, whereby the objectionable proportions of the selenium are eliminated from said materials, water-leaching the roasted slimes to remove therefrom substantially all the copper sulphate and at least some silver in the form of silver sulphate, the leach waters being substantially free of selenium, precipitating the silver from said leach waters by the use of copper, and charging said precipitated silver directly into a doré furnace, together with the water-leached slimes, for further refining.

8. A process of treating materials of the nature of copper refinery "tank-house sludges" or "anode slimes" containing precious metal, with copper and/or silver selenides in substantial quantities, said process comprising subjecting the raw slimes to a sulphatizing roast while rabbling the same through a plurality of zones in a furnace, thus converting the copper and/or silver selenides to the corresponding sulphates and the selenium being thereby liberated from the selenides as volatilized selenium and/or selenium dioxide, conducting such selenium and/or selenium dioxide as formed out of the presence of the roasted slimes, whereby the objectionable proportions of the selenium are eliminated from said materials, water-leaching the roasted slimes to remove therefrom substantially all the copper sulphate and at least some silver in the form of silver sulphate, the leach waters being substantially free from selenium, precipitating the silver from said leach waters, charging said precipitated silver directly into a doré furnace, together with the water-leached slimes, for further refining, and treating the leach liquors after said precipitation of silver therefrom, in liberators to yield a deposit of cathode copper.

9. A process of treating materials of the nature of refinery "tank-house" sludges or "anode slimes" containing selenides in substantial quantities, which comprises roasting the slimes or the like with sulphuric acid, passing the resulting gases and volatilized material into a condenser maintained at a temperature below the point at which selenium dioxide crystallizes and above the point at which sulphuric acid will condense.

10. A process of treating materials of the nature of refinery "tank-house" sludges or "anode slimes" containing selenides in substantial quantities, which comprises roasting the slimes or the like with sulphuric acid, passing the resulting gases and volatilized material into a condenser for separating out selenium dioxide in crystallized form, and then passing the remaining gases and volatilized material through a scrubbing tower wherein the selenium thereof is deposited.

11. A process of treating materials of the nature of refinery "tank-house" sludges or "anode slimes" containing selenides in substantial quantities, which comprises roasting the slimes or the like with sulphuric acid, passing the resulting gases and volatilized material into a condenser, thereafter separating the volatilized acid and the volatilized selenium products, and recovering the acid and utilizing the same in said roasting step.

12. A process of treating materials of the nature of copper refinery "tank-house" sludges or "anode slimes" containing precious metal and selenides in substantial quantities, which comprises roasting the slimes or the like with sulphuric acid, and removing the resulting gases and volatilized materials as soon as formed from the area of roasting, whereby the selenium content of the sludges or slimes is largely eliminated therefrom, then leaching in water the roasted sludges or slimes and recovering the precious metal from the roasted and leached slimes and from the leach water, recovering copper from the leach water, and also recovering acid from the leach water and utilizing the same in said roasting step.

13. A process of treating materials of the nature of copper refinery "tank-house" sludges or "anode slimes" containing precious metals, with copper and/or silver selenides in substantial quantities, said process comprising the roasting of the raw slimes in a multiple hearth muffle type furnace at 650°–700° F., the material being rabbled successively over several superposed hearths with sprays of sulphuric acid applied to the material on one or more of said hearths whereby the selenides are converted to the corresponding sulphates and the selenium is largely eliminated from the material as volatilized selenium and/or selenium dioxide.

14. A process of treating materials of the nature of copper refinery "tank-house" sludges or "anode slimes" containing precious metals, with copper and/or silver selenides in substantial quantities, said process comprising the roasting of the raw slimes in a multiple hearth muffle type furnace at 650°–700° F., the material being rabbled successively over several superposed hearths with sprays of sulphuric acid applied to the material on one or more of said hearths whereby the selenides are converted to the corresponding sulphates and the selenium is largely eliminated from the material as volatilized selenium and/or selenium dioxide, and said furnace being operated under slight draft insufficient to cause any substantial flue dust and consequent loss of precious metal.

15. Process of separating selenium and tellurium from material containing the same, which comprises roasting the material with sulphuric acid in a muffle type furnace having a plurality of superposed hearths over which the material is rabbled while subjected to sprays of the acid, whereby the selenium content passes from the furnace in volatilized forms of selenium and selenium compounds.

16. Process of separating selenium and tellurium from material containing the same, which comprises subjecting the material to a sulphatizing roast in a muffle type furnace whereby the selenium content may be withdrawn from the furnace in volatilized forms of selenium and selenium compounds, and withdrawing the tellurium content from the furnace as tellurides contained in the roasted solid material.

17. Process of recovering tellurium from slimes containing the same, which comprises subjecting the slimes to a sulphatizing roast, subsequently oxidizing the tellurium content with a reagent, then treating the leach solution with a neutralizing reagent whereby the tellurium is precipitated, and further purifying the precipitated tellurium by treating the same with hydrochloric acid and again precipitating the tellurium with sulphur dioxide.

18. Process of treating materials of the nature of refinery "tank-house" sludges or "anode slimes" containing tellurides, copper selenides and/or silver selenides, which comprises roasting the materials in the presence of sulphuric acid whereby the selenium content is substantially removed in volatilized forms of selenium and selenium compounds, leaching the roasted slimes with water, treating the leach waters to precipitate silver therefrom, treating the precipitated silver in a doré furnace, oxidizing the roasted leach slimes and recovering tellurium from the latter by leaching the same with a reagent and treating the leach solution with a neutralizing reagent to precipitate the tellurium, and also treating the residue to slimes from the latter leach solution in the doré furnace.

19. Process of separating the selenium content from the tellurium content of refinery "tank-house sludges" or "slimes", which comprises roasting the sludges or slimes while rabbling the same and applying successive amounts of a sulphatizing material to the surfaces of the sludges or slimes exposed by such rabbling, withdrawing the gases and vapors as evolved from the roasting material substantially without entrained solid particles, whereby the selenium content is eliminated in volatilized forms of selenium or its compounds from the sludges or slimes and the tellurium content remains therein.

20. Process of separating the selenium content from sludges or slimes containing the same, which comprises treating the sludges or slimes as by filtering, to remove a substantial proportion of the liquid therefrom, then roasting the sludges or slimes while rabbling the same and applying to the surfaces as exposed by such rabbling action, sprays of sulphuric acid, and withdrawing the evolved gases and vapors as formed from the roasting material, whereby the selenium content of the sludges or slimes is largely eliminated therefrom in volatilized forms of selenium or its compounds.

21. Process of separating the selenium content from sludges or slimes containing the same, which comprises treating the sludges or slimes to substantially reduce the proportion of liquid thereof, then roasting the sludges or slimes while rabbling the same and applying to the surfaces as exposed by such rabbling action successive amounts of a sulphatizing material, the roasting being conducted at a temperature of approximately 700° F. or a lesser temperature sufficient to cause substantial quantities of selenium or its compounds to be evolved from the sludges or slimes, whereby the selenium content is largely eliminated therefrom in volatilized forms of selenium or its compounds.

22. Process of separating the selenium content from the tellurium content of sludges or slimes, which comprises roasting the sludges or slimes while rabbling the same and applying a sulphatizing material to the surfaces of the sludges or slimes as exposed by such rabbling, said roasting being conducted at a temperature of approximately 700° F. or a lesser temperature sufficient to cause substantial quantities of the selenium content to be evolved as gases or vapors, withdrawing such gases or vapors as evolved under conditions such that the same will be substantially free of entrained solid particles from the sludges or slimes, whereby the selenium is eliminated in volatilized forms of selenium or its compounds from the sludges or slimes and the tellurium content remains therein.

23. Process of recovering selenium from refinery sludges or slimes containing selenides in substantial amounts, which comprises roasting the sludges or slimes while rabbling the same and applying successive amounts of a sulphatizing material to the surfaces of the sludges or slimes as exposed by such rabbling whereby the selenium content is evolved as gases and/or vapors, such roasting being conducted at a temperature and continued for a time sufficient to eliminate from the sludges and slimes in the neighborhood of 95% of the selenium content.

24. Process of separating the selenium content from sludges or slimes containing the same, which comprises roasting the sludges or slimes while rabbling the same, and applying a sulphatizing material during such roasting to the surfaces of the sludges or slimes when exposed by such rabbling, whereby the selenium content is evolved from such surfaces as gases and/or vapors.

25. Process of separating the selenium content from sludges or slimes containing the same, which comprises roasting the sludges or slimes while rabbling the same substantially with the exclusion of air, and applying a sulphatizing material during such roasting to the surfaces of the sludges or slimes exposed by such rabbling, whereby the selenium content is evolved from such surfaces as gases and/or vapors.

OLIVER C. MARTIN.
CHARLES W. CLARK.